United States Patent [19]

Kaltz et al.

[11] Patent Number: 4,529,243
[45] Date of Patent: Jul. 16, 1985

[54] VEHICLE WITH A CONVERTIBLE TOP

[75] Inventors: Milton C. Kaltz, Allen Park; Michael P. Alexander, Groose Ile; Howard C. Lehr, Monroe, all of Mich.

[73] Assignee: ASC Incorporated, Southgate, Mich.

[21] Appl. No.: 489,818

[22] Filed: Apr. 29, 1983

[51] Int. Cl.³ .............................................. B60J 7/12
[52] U.S. Cl. .................................................. 296/107
[58] Field of Search ....................... 296/107, 108, 109; 29/401.1

[56] References Cited

U.S. PATENT DOCUMENTS

| 1,952,252 | 3/1934 | Heuser | 296/107 |
| 2,382,635 | 8/1945 | Humer | 296/107 |
| 3,155,424 | 11/1964 | Bauer | 296/107 |
| 4,346,930 | 8/1982 | Northey | 296/107 |

FOREIGN PATENT DOCUMENTS

| 889904 | 2/1962 | United Kingdom . |
| 957271 | 5/1964 | United Kingdom . |
| 1194910 | 6/1970 | United Kingdom . |
| 2112719 | 7/1983 | United Kingdom . |

Primary Examiner—Robert R. Song
Attorney, Agent, or Firm—Basile, Weintraub & Hanlon

[57] ABSTRACT

A vehicle having a convertible top includes internal body reinforcement members including a belt line reinforcement assembly attached to the upper back panel and the upper portion of the body quarter panels. The belt line reinforcement assembly is connected to quarter panel reinforcements to form a box-like structure having an aperture therethrough which disposes the trunk and passenger compartments of the vehicle in communication. The quarter panel reinforcement members are attached to the body quarter panels and the wheelhouse panels of the vehicle. A cross-support member attached to the rear seat riser portion of the compartment floor pan and rocker panel reinforcement are also provided. A header is mounted to the upper edge of the vehicle windshield and is provided with a recessed rear portion for receiving the front cross-bow of the convertible top in a flush alignment with the upper surface of the header.

3 Claims, 8 Drawing Figures

VEHICLE WITH A CONVERTIBLE TOP

BACKGROUND OF THE INVENTION

1. Field of the Invention

This invention relates, in general, to automobiles and, more specifically, to automobiles having a convertible top.

2. Description of the Prior Art

Vehicles, such as automobiles have been provided with a convertible top comprised of a fabric covered framework formed of articulatable side rails, interconnecting cross bows and an operating linkage typically powered by hydraulic cylinders for raising and lowering the top between an errected position over the vehicle body and a retracted or lowered position within a storage compartment behind the rear seat of the vehicle. Due to the lack of a rigid roof structure in such vehicles when the convertible top is in the lowered position, the thickness of the vehicle body panels must be increased or additional reinforcements or braces added to the vehicle body panels to provide the necessary structured strength for the body.

A common reinforcement added to increase the structural integrity of a vehicle body having a convertible top is a rigid cross-panel member mounted within the passenger compartment behind the rear seat and extending between and joined to the quarter panels of the vehicle. The cross panel is typically solid in form and extends vertically between the compartment floor pan and the top of the rear seat of the vehicle. The cross panel member is spaced from the rear trunk support member and forms a well or storage space for the convertible top when the top is in the lowered position. While the cross panel member is effective in providing sufficient structural strength to the vehicle body, it necessarily adds considerable weight to the vehicle and, therefore, increases the cost of the convertible top option.

While the additional support structure required for a vehicle body having a convertible top can easily be provided during the design stages of the vehicle, difficulties are encounterd when a vehicle having a rigid or hard top is to be converted into a vehicle with a convertible top. Since the required structural strength is not designed into the vehicle body itself, many additional support members and reinforcements are required which necessarily increases the cost and complexity of the convertible top conversion.

Thus, it would be desirable to provide a vehicle having a convertible top which overcomes the problems of previously devised vehicles having convertible tops relating to the number and size of the components needed to be added to the vehicle to provide the requisite structural strength for the vehicle body. It would also be desirable to provide a convertible top which can be installed as a conversion assembly on a vehicle initially having a rigid hard top.

SUMMARY OF THE INVENTION

The present invention is a vehicle having a convertible top. Reinforcement members are secured to certain interior body panels of the vehicle to provide the requisite structural support for the vehicle body. The reinforcement members include an upper belt line reinforcement joined to and extending across the upper portion of the body quarter panels and the rear upper back panel. Reinforcement members are also secured between the vehicle quarter panels and the wheel house. The belt line and quarter panel reinforcement members define a box-like structure with an aperture formed therein which provides communication between the trunk and passenger compartments of the vehicle so as to enable the elongated objects to be stored within the vehicle when the rear seats of the vehicle are folded down.

A header mounted on the upper edge of the windshield of the vehicle includes a laterally extending edge portion recessed below the top surface of the header. First and second seal members are mounted on the header for sealing the front edge of the convertible top. The front edge of the first cross bow of the convertible top is received in the recessed edge portion of the header such that the convertible top is mounted in a flush alignment with the top edge of the vehicle windshield.

Latches mounted on the front cross bow of the convertible top releasably engages apertures formed in the structure surrounding the windshield to lock the top in position on the vehicle. The apertures are located at the intersection of the header and windshield pillar.

The unique vehicle with a convertible top of the present invention provides several features and advantages not found with previously devised vehicles having convertible tops. The support structure added to the interior body panels of the vehicle provides the necessary structural integrity for the vehicle and uniquely enables an opening to be formed between the trunk and passenger compartments so as to enable elongated articles to be disposed within the interior of the vehicle when the rear seat of the vehicle is folded down. Such a capability has previously not been provided in vehicles with convertible tops due to the support panels previously utilized to provide the necessary structural strength for the vehicle body.

Furthermore, the unique header attached to the top edge of the windshield enables the first cross-bow of the convertible top to be disposed in-line with the top edge of the header so as to provide a flush, smooth appearance to the front edge of the convertible top. This compares favorably with previously devised attachment methods in which the front edge of the convertible top overlays the upper edge of the windshield of header mounted thereto.

The header and adjoining structure are provided with apertures for releasably receiving latches mounted on the front cross-bow of the convertible top. This unique arrangement eliminates the need for the costly casting that was previously mounted on the top edge of the windshield for aligning and latching the top in the raised position.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENT

Figure 1:
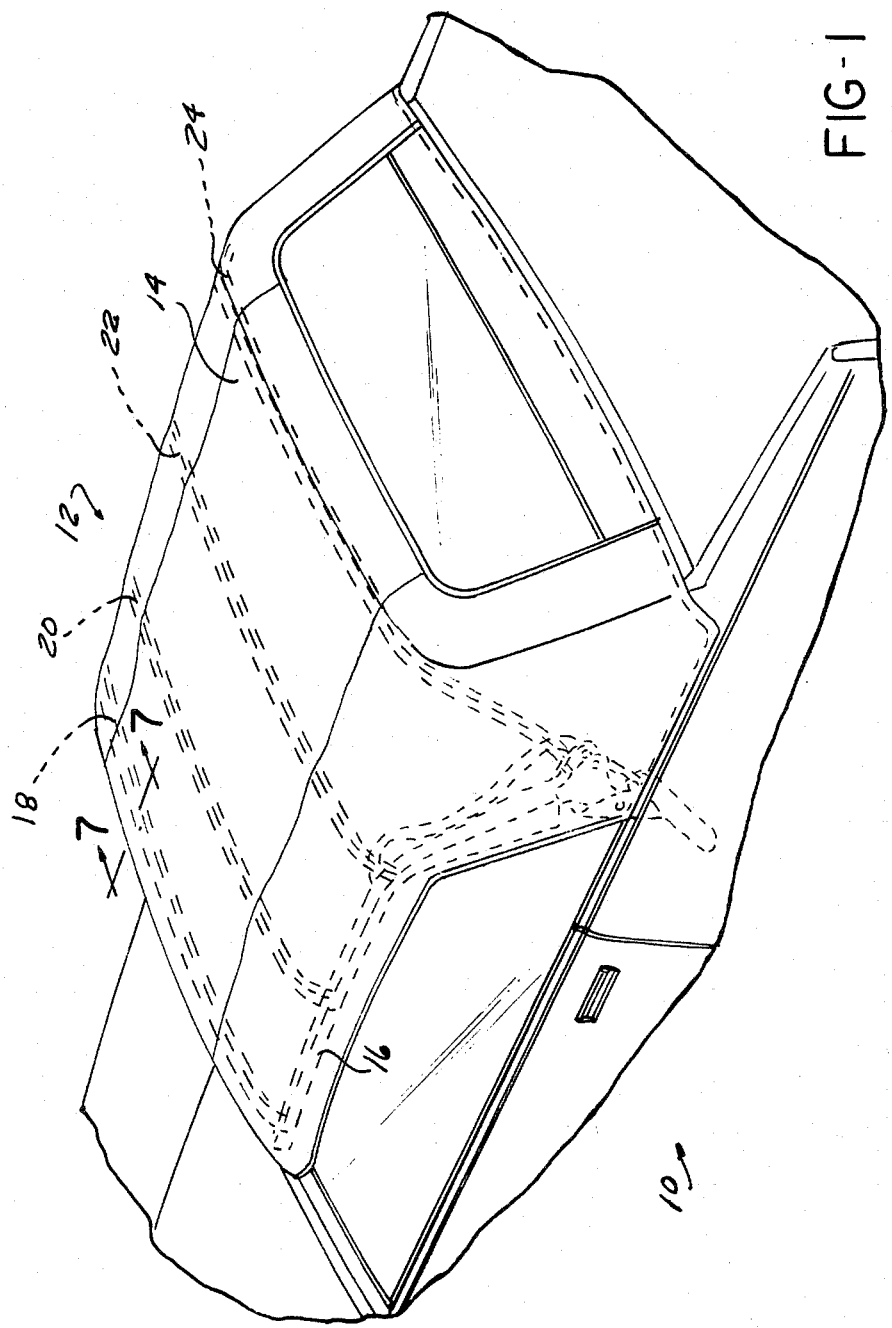
FIG. 1 is a partial, perspective view of a vehicle constructed in accordance with the teachings of the present invention having a convertible top mounted therein.

Throughout the following description and drawing, an identical reference number is used to refer to the same component shown in multiple figures of the drawing.

Figure 2:
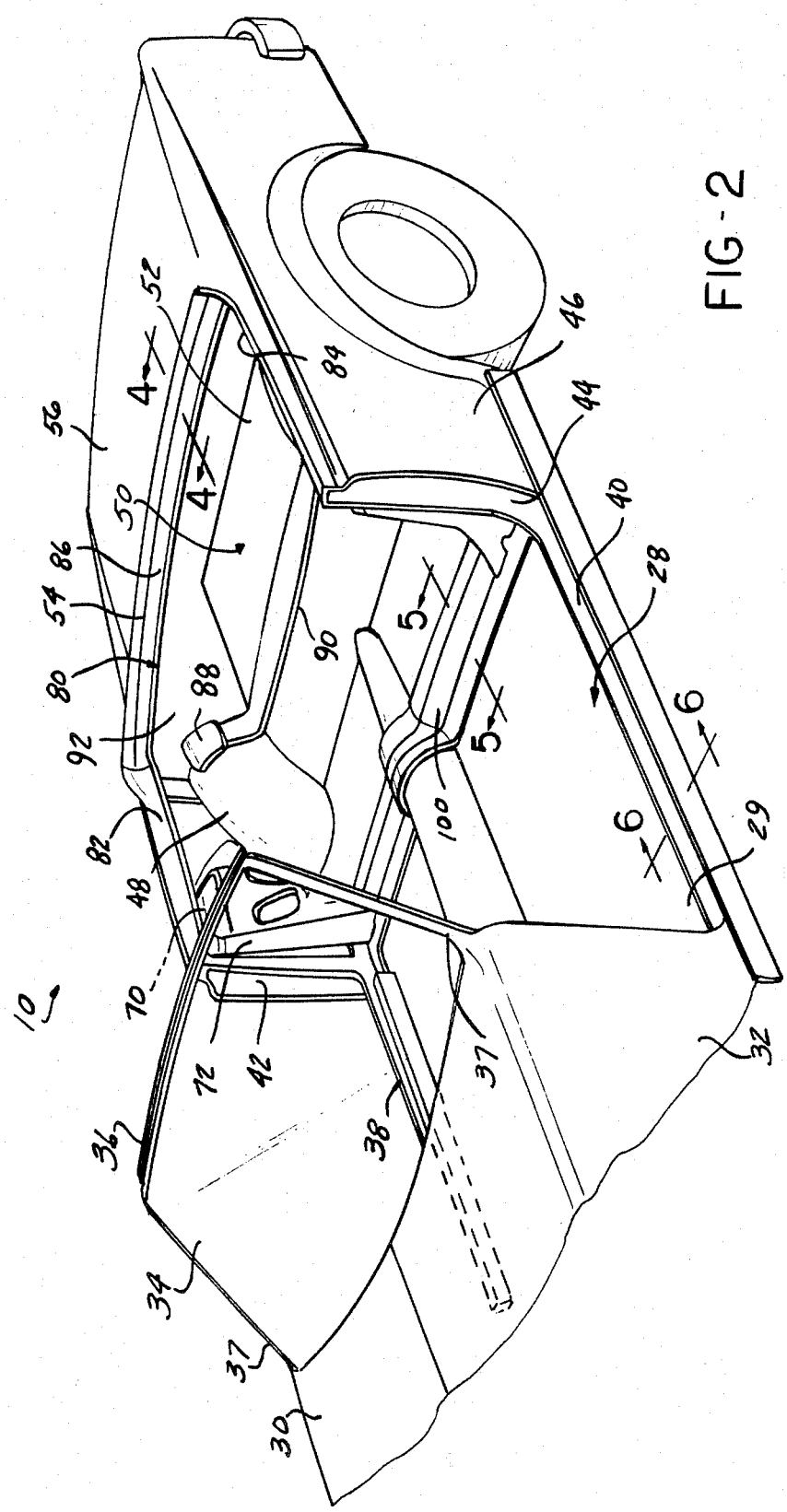
FIG. 2 is a partial, perspective view of the vehicle shown in FIG. 1 illustrating the reinforcement structure added to the vehicle.

Referring now to the drawing and to FIGS. 1 and 2 in particular, there is illustrated a vehicle 10 having a convertible top 12 mounted therein which is adapted for movement between an erected position over the vehicle 10 and a retracted or lowered position in which the top 12 is stored in a compartment or storage space formed in the vehicle 10. The vehicle 10 may be initially designed to receive the convertible top 12 or, in a preferred embodiment, the top 12 is mounted on the vehicle 10 as a conversion. In this embodiment the rigid roof of the vehicle 10 is removed and the top 12 and reinforcement members described hereafter mounted on the vehicle.

The convertible top 10 includes a fabric cover 14 formed of a flexible material, such as vinyl, cloth, etc. The fabric cover 14 is mounted on a frame work comprising a pair of spaced articulatable side rails 16, interconnecting cross-bows, such as front cross-bow 18, first and second central cross-bows 20 and 22 and a rear cross bow 24. The cross-bows 18, 20,22 and 24 extend between and are joined to the side rails 16.

An operating linkage, not shown, is connected to the rear end of the side rails 16 and certain of the cross-bows and disposed within the interior of the body of the vehicle 10. Typically, as shown in U.S. Pat. Nos. 3,180,675; 3,251,625 and 3,328,072, the contents of which relating to the linkage is incorporated herein by reference, and pivotal members which are driven by a pair of hydraulic cylinder, to extend or retract the convertible top framework.

As the framework of the convertible top 10 does not form a part of the present invention and its construction, number of elements, etc., may vary depending upon the size of the vehicle and shape of the top 10, a detailed description of the convertible top 10 and pivotal framework will not be included herein.

As is conventional, the vehicle 10 includes a body having a passenger compartment 28 defined by a floor pan 29. A front end assembly comprising a front deck or hood 30 is mounted between a pair of spaced fenders 32. A windshield 34 is mounted above the front deck or hood 30 and is supported between an upper frame 36 and side body pillars 37. A pair of opposed rocker panels 38 and 40 and extend rearward from the front end assembly and are each comprised of a box-like section formed of interconnected members.

A pair of vertically extending lock pillars 42 and 44 are mounted on top of the rocker panels 38 and 40, respectively, and define a door opening with the rocker panels 38 and 40 and the front end assembly. Opposed quarter panels 46 extend rearward from the lock pillars 42 and 44. Wheelhouse panels 48 are mounted interiorally of the quarter panels 46.

The vehicle 10 is also provided with a trunk compartment 50 which is formed by a rear compartment pan or floor 52 an upper back panel 54 extending between and connected to the quarter panels 46 and a rear deck lid 56.

Figure 3:
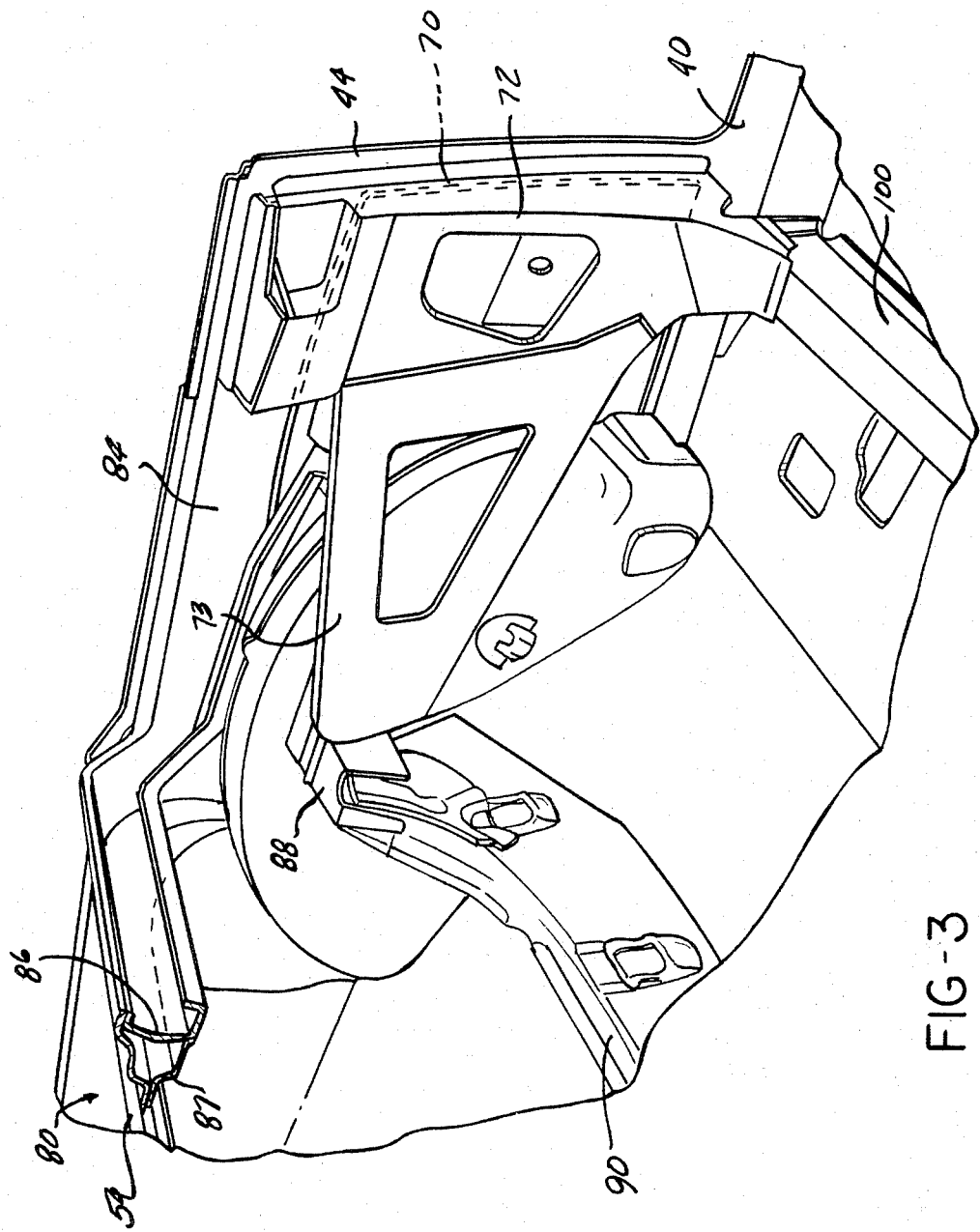
FIG. 3 is an enlarged, partial, perspective view of the reinforcement structure shown in FIG. 2.

In order to provide the necessary structural strength for vehicle 10, a plurality of reinforcement members are mounted to the interior body panels of the vehicle 10, as shown in FIGS. 2 and 3. Quarter panel reinforcement means including a quarter inner panel member 70 and a lock pillar reinforcement member 72 is provided for strengthening the vehicle quarter panels. The quarter panel inner member 70 is mounted to the inner side of each quarter panel 46 and extends between the body lock pillars 42 or 44 and the wheelhouse panels 48.

The lock pillar reinforcement member 72 is secured to each quarter panel inner member 70 and provides inboard and outboard stability for the doors of the vehicle 10. The lock pillar reinforcement member 72 extends between each rocker panel at the intersection of the rear seat riser section of the floor pan 29 and the rocker panel diagonally upward to the top of the lock pillar 37.

A diagonal brace 73 extends between and is secured to the lock pillar reinforcement member and the wheelhouse.

The interconnected quarter panel inner members 70, the lock pillar reinforcements 72 and braces 73 provide structural stability for the vehicle 10 and stabilize the quarter panels 46 from lateral movement. Further, the quarter panel inner members 70 and the body lock pillar reinforcements 72 are connected to the wheelhouse members 48 by the braces 73. This provides increase seat width in the vehicle 10.

Figure 4:
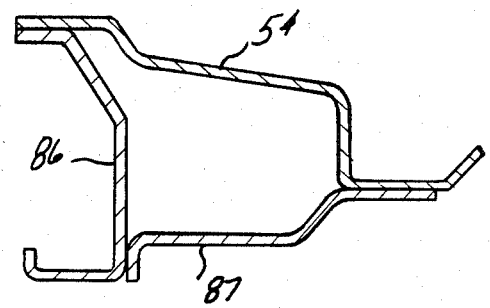
FIG. 4 is a cross-sectional view generally taken along line 4—4 in FIG. 2.

A belt line reinforcement means 80 is also provided in the vehicle 10. The belt line reinforcement means 80 comprises a channel-shaped member which is mounted on the belt line of the vehicle 10. In a preferred embodiment, the belt line reinforcement means 80 includes first and second quarter rail belt members 82 and 84 which are secured to the inward side of the upper ends of the quarter panels 46 and extend rearward from the lock pillars 42 and 44, respectively. A belt line reinforcement member 86 is secured to the forward edge of the upper back panel 54 of the vehicle 10 and is spaced above the compartment floor. As shown in FIG. 4, an upper back panel reinforcement member 87 extends between and is secured to the belt line reinforcement member 86 and the upper back panel member 54.

Means are provided for attaching the belt line reinforcement means 80 to the quarter panel reinforcement means. Preferably, the attaching means includes the first and second quarter rail reinforcement members 82 and 84 which are secured to the belt line reinforcement member 86 and the lock pillar member 72.

The belt line reinforcement means 80, the quarter panel inner members 70 and the lock pillar reinforcements 72 cooperate to form a box-like section having an aperture 92 formed therebetween. The aperture 92 provides communication between the trunk compartment 50 and the passenger compartment 28 in the vehicle 10.

Figure 5:
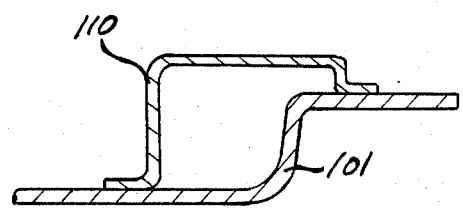
FIG. 5 is a cross-sectional view generally taken along 5—5 in FIG. 2.

Additional support for the vehicle 10 is provided by a cross panel 100 which is mounted on and extends across the rear seat riser within the passenger compartment 28 as shown in FIGS. 3 and 5. The cross panel member 100 has the lower ends of the body lock pillar reinforcements 72 disposed thereover.

Figure 6:
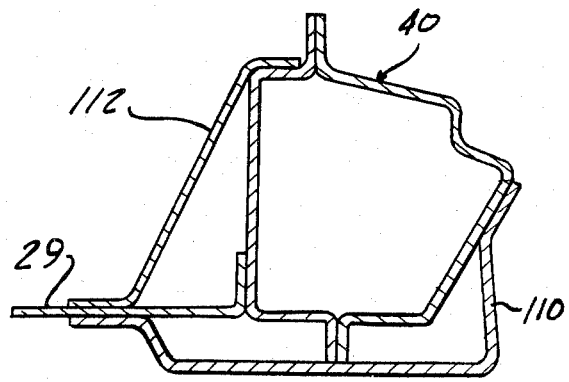
FIG. 6 is a cross-sectional view generally taken along line 6—6 in FIG. 2.

The vehicle 10 is also provided with rocker panel reinforcements. The rocker panel reinforcements comprise inner and outer panel members, such as panel members 110 and 112 shown in FIG. 6, which are secured about the box-like rocker panels, such as rocker panel 40. Further details concerning the construction of the rocker panel reinforcements may be had by referring to pending U.S. patent application Ser. No. 362,629, filed Mar. 29, 1982, the contents of which are incorporated herein by reference.

Figure 7:
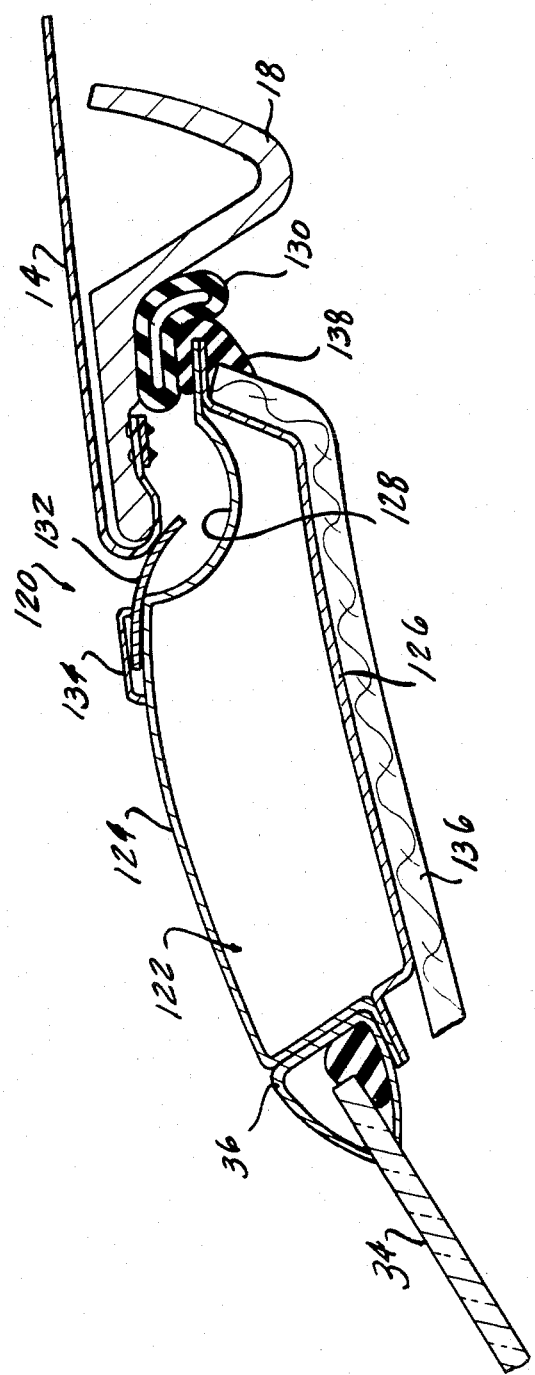
FIG. 7 is a cross-sectional view generally taken along line 7—7 in FIG. 1.

Referring now to FIG. 7, there is depicted construction of a front header assembly 120 which is used to attach the front edge of the front cross-bow 18 of the convertible top 12 to the upper edge of windshield 34 of the vehicle 10. The front header assembly 120 includes a header 122 in the form of a box-like section having an upper panel 124 and a spaced, bottom panel 126. The front edge of the header 122 is mounted on the frame 36 secured to the upper edge of the windshield 34.

The upper panel 124 of the header 122 has a recessed rearward end portion 128 which forms a laterally extending groove across the front edge of the vehicle windshield 34. The groove 128 serves as a ledge for receiving the front end of the front cross-bow 18 of the top 12 such that the fabric cover 14 attached to the front cross-bow 18 is disposed in an in-line or flush arrangement with the upper panel 124 of the header 122.

A first seal member 130 is secured to the rearward edge of the header 122 for sealing the front cross-bow 18 on the header 122. A second seal member 132 is secured to the upper panel 124 of the header 122 by means of a belt 134. The second seal 132 is engaged by the front end of the front cross-bow 18 when the convertible top is moved to the raised position and serves to sealingly close the front edge of the top 10.

A front headliner portion 136 is also secured to the header portion 122 by means of a clamping strip 138. The clamping strip 138 is mounted about the ends of the first and second panels 124 and 126 of the header 122 and has the first seal 130 mounted thereon.

Figure 8:
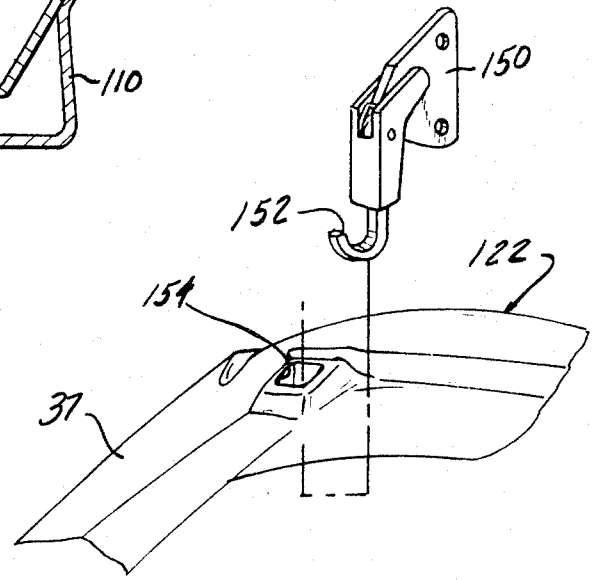
FIG. 8 is a partial, perspective view of the means for latching the convertible top to the vehicle.

The convertible top 12 is also provided with a latch mechanism for latching the forward end of the top 12 to the vehicle 10 when the top 12 is in the raised position closing the vehicle body. As is conventional, a pair of pivotal handles are mounted on the front cross-bow 18 of the top 12 and operate a pivotal latch member 150. As shown in FIG. 8, the latch member 150 includes a depending hook-like portion 152 the latch member 150 is raised or lowered upon pivotal movement of the handle, not shown.

An aperture 154 is formed in the upper end of each of the windshield side pillars 37 upward of the end of the header 122. The hook-like portion 152 of the latch member 150 is adapted to be releasably inserted into the aperture 154 to engage the surrounding sheet metal of the windshield side pillar 37 to latch the top 12 to the vehicle 10. The latch member 150 may be released from engagement with the side pillar 37 to enable the top 12 to be moved to the retracted, lowered position.

The vehicle 10 of the present invention is also provided with other features to complete the installation of the convertible top 12 therein. A flexible headliner, not shown, is mounted interally on the top 12 underneath the side rails 16 and the cross-bows 18, 20, 22 and 24.

The flexible headliner functions to cover the interior of the top 12 from the view.

Further, latch means are provided for releasably latching the rear seat backs in an upright position. The latch means operates to retain the seat back in an upright position or enable it to be folded down to a forward facing position. The latch means includes retainers, not shown, mounted on the outboard edges of the rear seat back. Suitable releasable latch means mounted on the wheelhouse panels of the vehicle 10 releasably engage the retainers. Control means is utilized to control the operation of the latching means.

Control means may comprise a cable or, preferably, an electrically-operated celluloid which is selectively energizable to move the latching means to the unlatched position and enable the rear seat back to be folded down.

In summary, there has been disclosed a vehicle having a convertible top which includes many features and advantages not previously provided. The vehicle of the present invention is provided with a reinforcement structure which provides structural stability for the vehicle, and, at the same time, provides an aperture between the trunk and passenger compartments to enable elongated articles to be disposed completely within the interior of the vehicle when the rear seat of the vehicle is folded down. The vehicle of the present invention is also provided with a front header which is adapted to receive the forward end of the convertible in a flush, aligned arrangement to provide a smooth exterior appearance for the convertible top.

What is claimed is:

1. In a vehicle having a folding top comprised of articulatable side ride members and a plurality of cross bows interconnected between the side rails and movable between a raised position covering the vehicle and latched to the windshield of the vehicle and a lowered position, the improvement comprising:
    header means secured to and extending across the upper edge of the windshield, the header means having an upper surface;
    a transversely extending recessed portion formed in the header means and spaced rearward of the vehicle windshield, the recessed portion terminating in a rearwardly extending flange, the recessed portion and the flange being disposed completely below the upper surface of the header means and forming a support surface to receive the forwardmost cross bow of the folding top and to dispose the upper surface of the folding to flush with the upper surface of the header means and
    seal means for sealingly engaging the forwardmost cross bow of the folding top on the rearwardly extending flange of the header means.

2. The improvement of claim 1 wherein the header means comprises:
    first and second members, each having a central portion, side portions extending away from the central portion and flanges extending outwardly from the ends of the side portions;
    the first and second members being joined together at the flanges in an inverted configuration.

3. In a vehicle having a folding top comprised of articulatable side ride members and a plurality of cross bows interconnected between the side rails and movable between a raised position covering the vehcile and latched to the windshield of the vehicle and a lowered position, the improvement comprising:

header means secured to and extending across the upper edge of the windshield, the header means including:

a transversely extending recessed portion spaced rearward of the vehicle windshield, the recessed portion receiving the forwardmost cross bow of the folding top to dispose the upper surface of the folding top in line with the upper surface of the header means;

first seal means mounted on the rear edge of the recessed portion of the header means and engagable by the forwardmost cross bow of the folding top; and second seal means mounted on the top surface of the header means and extending over and spaced above the recessed portion of the header means, the second seal means being engagable by the forward edge of the forwardmost cross bow for sealing the forward edge of the folding top.

* * * * *